US006732078B1

United States Patent
Luomi et al.

(10) Patent No.: US 6,732,078 B1
(45) Date of Patent: May 4, 2004

(54) AUDIO CONTROL METHOD AND AUDIO CONTROLLED DEVICE

(75) Inventors: Marko Luomi, Tampere (FI); Hannu Kari, Veikkola (FI); Peter Decker, Marl (DE); Janne Bergman, Tampere (FI)

(73) Assignee: Nokia Mobile Phones Ltd, Espoo (FI)

( * ) Notice: Subject to any disclaimer, the term of this patent is extended or adjusted under 35 U.S.C. 154(b) by 0 days.

(21) Appl. No.: 09/314,316

(22) Filed: May 19, 1999

(30) Foreign Application Priority Data

May 20, 1998 (FI) .................................................. 981127

(51) Int. Cl.[7] ............................................. G10L 21/00
(52) U.S. Cl. .................... 704/270.1; 704/270; 704/235; 704/260; 704/272
(58) Field of Search .................... 704/270, 270.1, 704/272, 275, 235, 260, 243

(56) References Cited

U.S. PATENT DOCUMENTS

| 5,168,548 A | * | 12/1992 | Kaufman et al. ............ 358/434 |
| 5,231,670 A | * | 7/1993 | Goldhor et al. ............. 704/275 |
| 5,386,494 A | * | 1/1995 | White ........................ 704/270 |
| 5,465,378 A | | 11/1995 | Duensing et al. .......... 395/800 |
| 5,479,476 A | | 12/1995 | Finke-Anlauff ............. 379/58 |
| 5,640,485 A | | 6/1997 | Ranta ........................ 395/2.6 |
| 5,699,486 A | * | 12/1997 | Tullis et al. ............. 704/270.1 |
| 5,812,954 A | | 9/1998 | Henriksson ................. 455/550 |
| 5,812,977 A | * | 9/1998 | Douglas ..................... 704/275 |
| 5,819,175 A | | 10/1998 | Niemi ........................ 455/418 |
| 5,822,731 A | * | 10/1998 | Schultz ...................... 704/240 |
| 5,864,603 A | | 1/1999 | Haavisto et al. ............ 379/88 |
| 5,864,607 A | * | 1/1999 | Rosen et al. ............. 379/90.01 |
| 5,873,076 A | * | 2/1999 | Barr et al. ............... 704/270.1 |
| 5,884,262 A | * | 3/1999 | Wise et al. ................. 704/270 |
| 5,884,266 A | * | 3/1999 | Dvorak ..................... 704/275 |
| 5,887,264 A | | 3/1999 | Kohler ....................... 455/461 |
| 5,892,475 A | | 4/1999 | Palatsi ....................... 345/352 |
| 5,924,069 A | * | 7/1999 | Kowalkowski et al. ..... 704/275 |
| 5,995,936 A | * | 11/1999 | Brais et al. ................ 704/275 |
| 6,185,537 B1 | * | 2/2001 | Oh et al. ................... 704/275 |

FOREIGN PATENT DOCUMENTS

DE 4440598 C1 5/1996
WO WO 97/49044 12/1997

OTHER PUBLICATIONS

Finnish Office Action.

* cited by examiner

*Primary Examiner*—Vijay Chawan
(74) *Attorney, Agent, or Firm*—Perman & Green, LLP (57) ABSTRACT

In a method for controlling a data processor (2) with a group of audio commands, information is presented on a display device (16) of the data processor, and at least one control field, to which a predetermined function is assigned is formed on the display device (16). In the method, one audio command from said group of audio commands is assigned to said control field, and an audio command assigned to said control field is presented on the display device, wherein when the user gives an audio command assigned to the control field, the recognition of the audio command as well as a function corresponding to the recognized audio command is conducted.

25 Claims, 3 Drawing Sheets

AUDIO CONTROL METHOD AND AUDIO CONTROLLED DEVICE

BACKGROUND OF THE INVENTION

1. Field of the Invention

The present invention relates to an audio control method for controlling a data processor with a group of audio commands, in which method information is presented on the display device of the data processor, and at least one control field, to which a predetermined function is assigned, is formed on the display device. The present invention also relates to a device controlled with audio commands, which comprises an audio recognition device, a data processor, a display device for presenting information, means for forming at least one control field on the display device, and means for assigning a predetermined function to said control field.

2. Brief Description of Related Developments

Generally, the purpose of audio control is to facilitate the use of various devices. Such audio control applications include, for example, different devices controlled with speech. Speech control applications are developed, for instance, for computers and telecommunication terminals, such as mobile phones and landline network telephones. With speech control, the user can control a computer by uttering different command words aloud, wherein the user does not have to use the keyboard of the computer for entering these commands. In a speech controlled telecommunication terminal, the user can select the telephone number by saying it aloud, typically one number at a time.

Instructing the computer with voice commands rather than using a pointing device such as a mouse also has significant benefits especially in small, communicator type terminal devices, such as Nokia 9110 Communicator, where the use of the keyboard and/or the pointing device may not be so convenient than the use of bigger keyboard and/or pointing device of e.g. desktop computers.

These speech recognizers are generally based on fixed vocabulary speech recognition or phoneme-based speech recognition. In the fixed vocabulary speech recognition, the device tries to select from a specified vocabulary the word which best corresponds to the word uttered by the user. It is also possible to implement such speech controlled devices in such a way that the user can instruct the device command words with his/her own voice, wherein the device recognizes best the words uttered by that user. The purpose of the speech control methods based on phoneme recognition is to recognize phonemes uttered by the user and to form words on the basis of these phonemes. Such devices based on phoneme recognition are, however, more complex and more expensive than fixed vocabulary speech recognition devices. Furthermore, especially in noisy circumstances the recognition is not as reliable with speech recognition devices based on phonetic recognition as with fixed vocabulary recognizers.

For implementing speech control in devices, in which it is necessary to use only a few command words or numbers, such fixed vocabulary recognizers are well suited. Nevertheless, the aim has been to accomplish speech control also in devices, during the use of which it might be necessary to utter a variety of command words, the command words varying in different situations. For example, when utilizing the Internet data network, it is possible to set up a connection by using several different addresses. Such a browser program for the Internet data network, so-called www browser (world wide web), has recently become common in computers. It is even possible to equip mobile telecommunication devices with such a www browser program, for examining data accessible via the Internet data network. Such a www browser program contains certain standard functions which are largely similar, irrespective of where the data is retrieved from. However, the data retrieved from the Internet data network, for example HTML pages (HyperText Markup Language), may contain active locations, for example links to other Internet addresses, e.g. URL (Uniform Resource Locator), option buttons etc. with varying names, contents and references. In practice, the recognition of these variable names is not possible when using recognition methods and devices of prior art, based on fixed vocabulary speech recognition. On the other hand, especially links can be composed of very long character strings, which the user has to be able to define accurately without misspellings when s/he wants to move to the location indicated by the link. Thus, the speech recognition methods and devices of prior art, based on phonetic recognition are not sufficiently reliable for implementing practicable speech recognition in said browser applications.

Using voice control for www browsing has the difficulty that the links are often long and complex, frequently containing numbers and other non text symbols. This makes them unnatural for a user to say in voice controlled browsing. This problem was solved earlier by instructing the user to say the name of the link (e.g., "Microsoft" for "www.microsoft.com", or "Nokia" for "www.nokia.com", . . . ), and then the technique known as speech recognition from text (SRFT) can be used to find the closest match of the input utterance to the currently displayed web links.

SRFT method creates speech recognition models based on text input. From each text entity an acoustic model which represents the spoken equivalent to the text entity is created. The acoustic models are then used to recognize which of the alternative text entities is uttered (if any). SRFT method relies on knowing (or creating) the phonetic structure of the links, making it possible to identify how the user should utter each link name.

Wireless Application Protocol (WAP) is a system architecture specifically designed for use in low bandwidth environment using terminals with varying, often limited, capabilities. Not all terminals are able to display images, for example. A central object of WAP is the WAP gateway (WAP gw), through which all of the traffic between communicating parties (e.g. the terminal and a content server) flows.

The WAP is capable of displaying normal HTML files to the user by converting the HTML to Wireless Markup Language (WML), which is a markup language specifically designed for WAP, in the WAP gateway. Of course the WML can be used independently from the HTML.

Because a small terminal, such as a portable phone, usually cannot display images, it is necessary to offer a textual replacement for an image. This can be done by using the ALT attribute of the image in the HTML, if one exists (e.g. <a href="main.html"><img border=0 src="img00253.gif" ALT="Jack's photo"></a>). The ALT attribute of the IMG tag will be displayed when the pointing device is placed on top of the image containing the link. If an image is used as a link, a text tag, very similar to a voice tag, must be created to be used as the link name if no ALT attribute (or equivalent) directive exists.

When terminals with text and voice I/O are used for www browsing for example in WAP environment, it is impossible for the user to distinguish between different pictures which are used as hyperlinks (i.e. '<a href=foo.html><img src=linkpicjpg></a>'type of links), since it is impossible to tell what the picture would tell to the user. Thus, it is very difficult to make a voice tag out of it, and the link name would be either the actual URL the link points to, or something very uninformative like ''. The fact that the name of the image usually does not provide too much information does not make it any easier. Too often the target URL is useless as well, since the target page may be accessed through a common gateway interface (cgi), which can have multiple arguments, or the URL contains multiple random digits and letters, which are difficult to speak and provide no information about the page the link points to. The common gateway interface means computer programs running on a webserver that can be invoked from a www page at the browser.

There is also a possibility that the user of the www browser selects a page, which contains multiple links with the same link name (i.e. numerous 'click<a href=foo.html>here</a> for info' type of links). In this case it is impossible to use the word 'here' (or whatever is the conflicting word or phrase) as a voice tag.

German publication DE-4440598 discloses a speech controlled hypertext navigation system. The aim of the system presented in the publication is to use the content of a hypertext document retrieved into the computer, such as an HTML page containing links, to define the possible phonetic form of the links included in it. When the user utters a link, the recognizer compares the phonetic forms produced of these links to the speech of the user, in order to find out which link the user uttered. Thus, the recognition is based on phonetic recognition. A drawback in the system presented in this publication is, for instance, that an HTML page can contain several links with nearly identical content, wherein it can be difficult or even impossible to distinguish them from each other. Moreover, the links can be long character strings, which complicates the recognition.

U.S. Pat. No. 5,465,378 discloses a report generating system. The system is based on report material which is stored in a computer and can contain text and images, and on command words connected to this material. The speech recognition device tries to recognize the command words uttered by the user and to retrieve from the memory the material corresponding to these command words, to generate a report. Also here the problem is that certain command words are linked with a particular function, wherein for introducing new functions, the recognition device has to be trained to recognize these new functions.

The above mentioned inventions do not provide a user friendly nor informative tag if the link name is difficult to pronounce or if the link is an image and the terminal is unable to display such an image.

SUMMARY OF THE INVENTION

One purpose of the present invention is to produce an audio recognition method and a device in which fixed vocabulary audio recognition, such as speech recognition, can be used also in a situation where control commands can vary. An audio recognition method according to the present invention is characterized in that in the method, one audio command from said group of audio commands is assigned to said control field, and the audio command assigned to said control field is presented on the display device, wherein when the user gives an audio command assigned to the control field, the audio command is recognized and the function corresponding to the audio command is conducted. An audio controlled device according to the present invention is characterized in that the device also comprises means for assigning an audio command to said control field, means for presenting the audio command assigned to the control field on the display device, means for recognizing the audio command, and means for conducting the function corresponding to the recognized audio command. The invention is based on the idea that part of the voice storage, such as the vocabulary, of a fixed vocabulary speech recognizer, is determined for controlling certain standard commands, and the other commands in the vocabulary can be set for addressing variable control functions. Hereinbelow in this description, the invention will be primarily illustrated with examples relating to speech control, but it is obvious that the use of also other sounds is possible in audio control. Examples of such audio signals include different clapping and knocking sounds.

Considerable advantages are achieved with the present invention compared with audio control systems of prior art, such as speech control methods and devices. With the method according to the invention, it is possible to implement control functions with a more advantageous fixed vocabulary speech recognizer also in a variable environment without having to instruct the new words to the speech recognition device. When using a speech recognition device according to the invention, the number of the commands to be selected at a time can be varied by joining several command words one after the other to select a particular function.

Using this invention, it is possible to generate meaningful tags even if the link is either an image, it is ambiguous, or it and the URL are difficult to pronounce. Also, this invention allows more powerful link name generation for voice only www browsers.

BRIEF DESCRIPTION OF THE DRAWINGS

In the following, the present invention will be described in more detail with reference to the appended figures, in which.

DETAILED DESCRIPTION OF THE PREFERRED EMBODIMENTS

Figure 1:
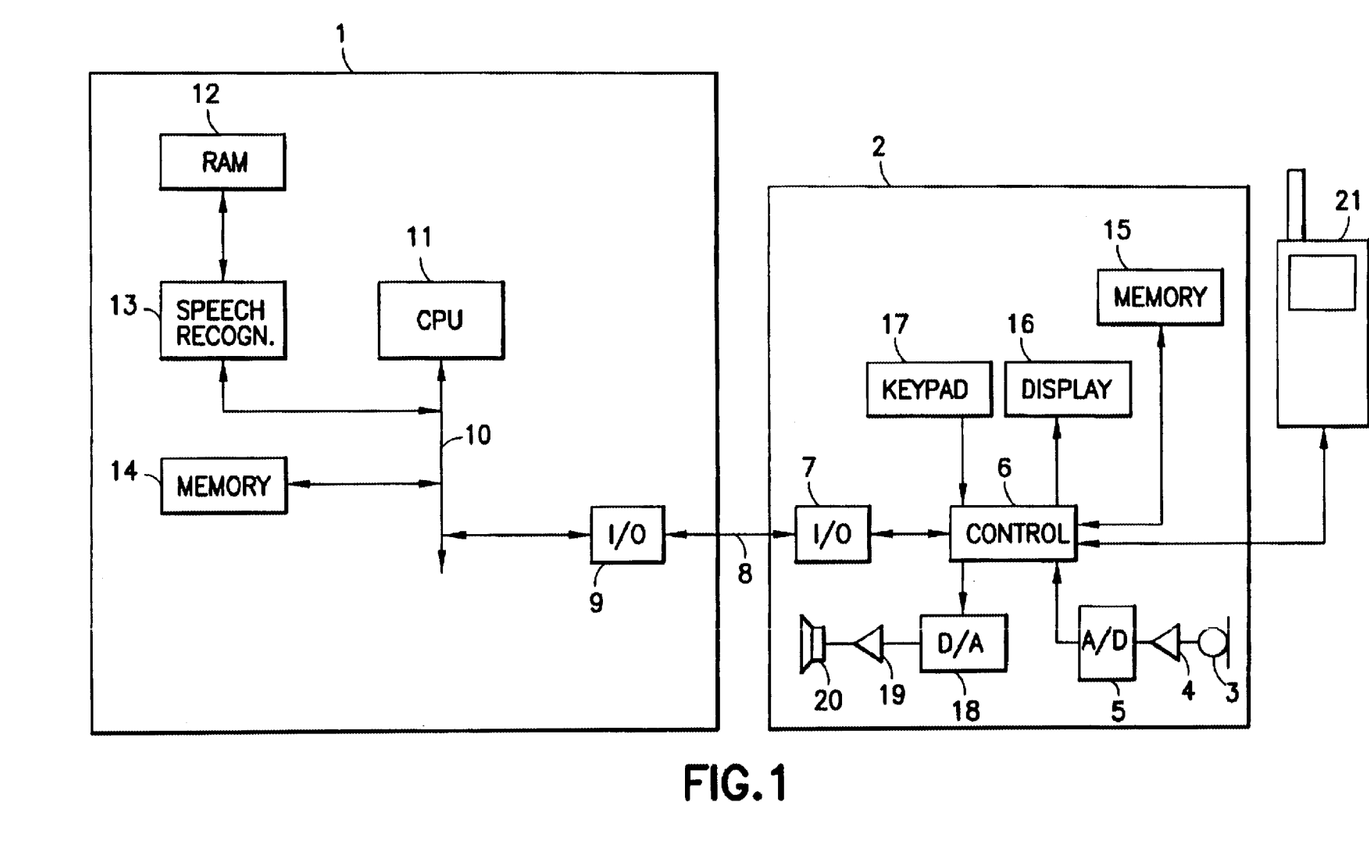
FIG. 1 shows a speech recognition apparatus according to an advantageous embodiment of the invention.

The apparatus according to FIG. 1 comprises a speech recognition device 1 and a data processor 2 which is controlled with the speech recognition device 1, when necessary. The data processor 2 comprises a microphone 3 for converting the sound commands given by the user into an electric audio signal. In connection with the speech recognition device 1, it is also possible to use a separate microphone (not shown) for giving speech commands to the speech recognition device 1. In the data processor 2, the microphone 3 is connected to a microphone amplifier 4, with which the audio signal produced by the microphone 3 is amplified. The amplified audio signal is transmitted to an analog/digital converter 5 to be converted to a digital format for further processing. The audio signal, converted into the digital format is transmitted via an interface block 7 in the data processor 2 and via an external data transmission channel 8 to an interface block 9 in the speech recognition device. The interface block 9 of the speech recognition device is advantageously connected to an internal data transmission channel 10 in the speech recognition device 1, wherein the audio signal can be transmitted via this data transmission channel 10 to a speech recognition means 13. This speech recognition means 13 consists advantageously of a digital signal processing unit (DSP), or the like. The speech recognition means 13 is also provided with a speech response memory 12, in which information required in speech recognition is stored for each command word to be recognized. Furthermore, the speech recognition means 13 is provided with a data memory, in which it is possible to store for instance audio signals for speech recognition on the basis of commands uttered by the user. From the speech recognition means 13, a signal line 10 is led to the interface block 9, via which the control signals produced by the speech recognition means 13 can be transmitted to the data processor 2. Examples of these control signals will be described later in this specification.

The data processor 2 advantageously comprises one or more control units 6, such as a micro processing unit ($\mu$P), a micro controller unit (MCU), or the like, for controlling the functions of the data processor 2. The data processor 2 also contains memory means 15, which contain advantageously a read only memory (ROM) and a random access memory (RAM). Furthermore, the data processor 2 comprises a display device 16 and a keyboard 17. The data processor 2 advantageously also contains an interface block 7, via which external signals can be transmitted to the data processor 2, in this case control commands produced by the speech recognition device 1 via the external data transmission channel 8.

Furthermore, in this advantageous embodiment of the invention, a wireless communication device 21 is connected to the data processor 2, and it can be used for example as a modem. Thus, it is possible to establish a data transmission connection from the data processor 2 for example to the Internet data network. This example does not present the structure of the wireless communication device 21 in detail, but it is prior art known by anyone skilled in the art. It is obvious that the present invention is not restricted solely to wireless communication, but it is also possible to conduct data transmission via a landline, using a landline telecommunication network.

The following is a description on the function of the method and the speech recognition device 1 according to the invention. Before the speech control functions, the device has to be instructed all the speech commands included in the vocabulary. The speech commands are instructed preferably at the manufacturing stage of the device, wherein different users can use the same speech recognition device 1. A second alternative is that these speech commands are instructed to the speech recognition device 1 by the user. Thus, the speech commands given by the user can typically be recognized more reliably than when using a ready-instructed speech recognition device. This can be implemented for example in such a way that the speech recognition device 1 is set to an instruction mode, for instance by starting an application program provided for this purpose in the data processor 2. The way in which the transition to the instruction mode is made, depends for instance on the data processor 2 used at a time and on the implementation of the speech control, and this is prior art known by anyone skilled in the art. After this, the user utters the command to be instructed at a time and advantageously, with the help of the application program functions, indicates which command was uttered. If necessary, the command is repeated several times in order to create a reliable record with respect to the speech recognition. The speech recognition means 13 generates an identification from the uttered command, which is stored in the speech response memory 12. There are several known alternative implementations of the speech recognition means 13 and the speech response memory 12, and these are known by anyone skilled in the art; hence, it is not necessary to discuss them in detail in this context, but reference is made e.g. to the reference publications mentioned in the description of prior art.

In the speech response memory 12, advantageously also the numbers from zero to nine are stored. The speech command instruction mode is advantageously terminated by means of a corresponding logout command of the application program, whereby the commands are stored.

In the following, the use of the speech recognition device 1 will be described by using the Internet data network and the functions applicable therein as an example. The user has started a browser program and set up a data transmission connection to the Internet data network, e.g. via the wireless communication device 21. After this, the user has retrieved information, such as an HTML page, from a desired location. Hereinbelow in this description, this HTML page will primarily be called a page. The location from which the page is retrieved, i.e. the search address, is given for example by typing with the keyboard 17 of the data processor. In connection with the transmission (loading) of the data of the page, the data is updated in the display device 16 of the data processor. Such a page typically contains different options, such as links to other pages, commands, etc. Furthermore, there can be some standard commands connected to the browser, such as stopping the loading (STOP), reloading (RELOAD), moving to the preceding page in browsing order (BACK), moving to the next page in browsing order (FORWARD), and opening a file or a page (OPEN). Conventionally these commands are controlled by means of a pointer (mouse), or by entering the corresponding data with the keyboard 17. In the speech control method according to the present invention, it is possible for the user to make selections also by means of speech. Speech control is determined to be activated for example at the stage when the browser program is started. It is presumed here that a fixed vocabulary speech recognition device 1 is being used. A further presumption is that the vocabulary of the speech recognition device 1 contains a number N of recognizable command words. A number M of these command words is allocated to be used for said standard commands (STOP, RELOAD, . . . ) of the browser, wherein in addition to this, there are a number P (P=N−M) of command words available to be used to conduct the functions on the HTML pages. These functions can vary on different pages, wherein in this description, these functions are called variable functions. Hereinbelow in this specification, the number P of command words P(1), P(2), . . . , P(P) intended for conducting the variable functions are, for the sake of clarity, called auxiliary command words. Correspondingly, the number M of command words M(1), M(2), . . . M(3) connected to the standard commands are called standard command words. These standard command words can be, for example, the names of these commands, such as STOP, RELOAD, etc. It is also possible to use for instance numbers 1, 2, . . . , P as auxiliary command words. What these standard command words and auxiliary command words are in practical applications, is not significant as such with respect to this invention.

Figure 2:
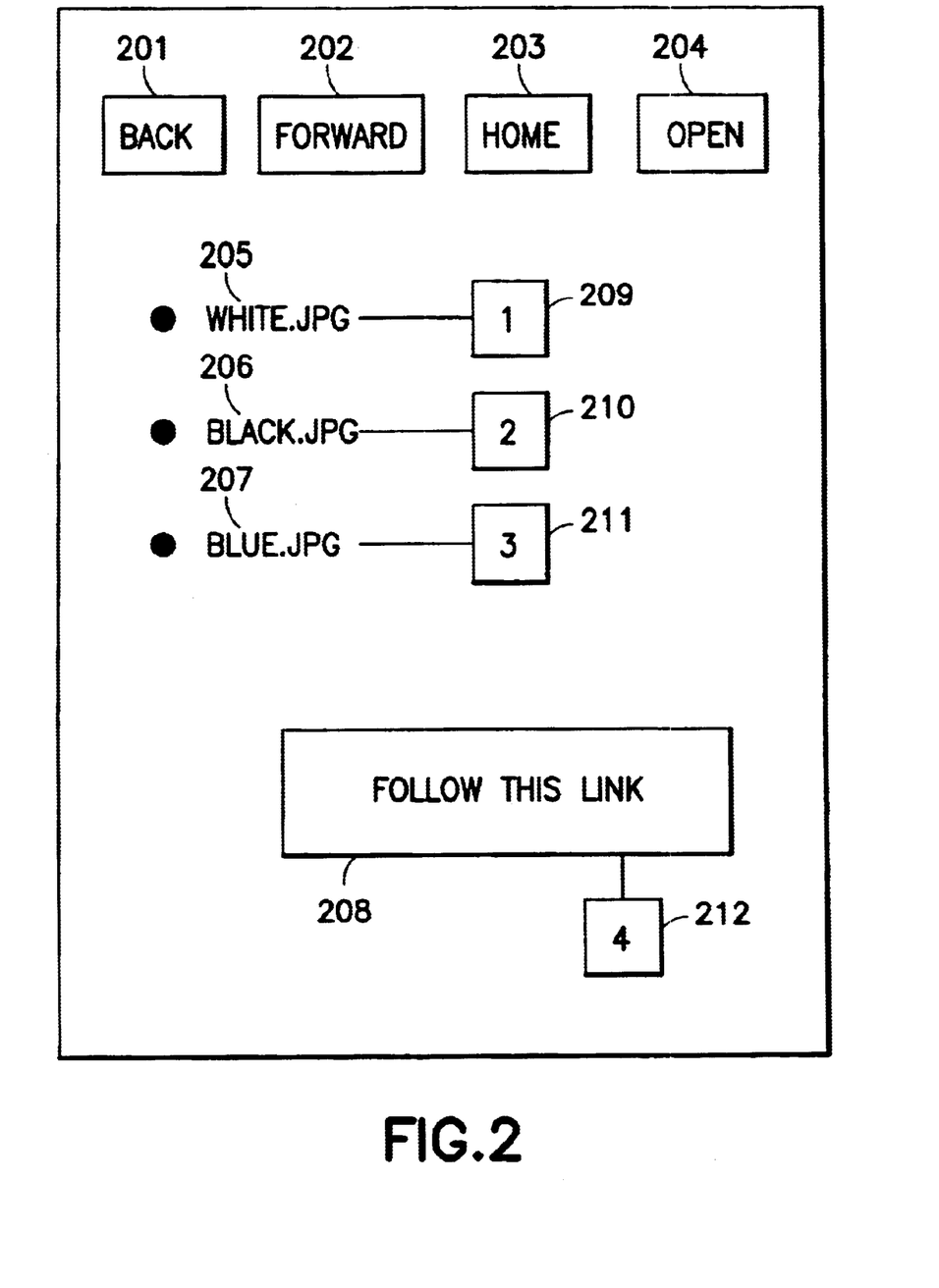
FIG. 2 shows an example of using the speech recognition device according to the invention for generating control functions.

In connection with the loading of the page, the speech recognition application program defines the corresponding auxiliary command words for the variable functions on the page. For example in the situation of the appended FIG. 2, the standard commands are BACK (reference number 201), FORWARD 202, HOME 203, and OPEN 204. Furthermore, the page contains variable functions, for instance links to image files WHITE.JPG 205, BLACK.JPG 206, BLUE.JPG 207, and FOLLOW THIS LINK option button 208. In this example, the application program defines for the links the auxiliary command words number 1, number 2 and number 3, and for the option button the auxiliary command word number 4. The application program presents these as symbols 209, 210, 211, 212 of the auxiliary command word definitions. In connection with loading a new page, the application program defines these auxiliary words again. After defining the auxiliary command words, the user can conduct the function in question by uttering the corresponding command word, which the speech recognition device 1 tries to recognize.

The recognition of the command can be conducted for example in such a way that the speech recognition means 13 calculates the probability between the first stored command word and the uttered command word. The next step is to examine, whether there are other command words stored in the memory. If there are still unexamined command words, the probability for the following command word is established. When the probability for all the stored command words has been established, the maximum calculated probability is determined. If the probability calculated for one stored command word is clearly higher than the probability calculated for the other command words, it can be concluded that the command word in question is the correct one, wherein a transition to the telephone number dialing mode can be made. If the command word could not be specified, it is possible to request the user to utter the command word again, until the selection can be specified.

After recognizing the command, the speech recognition device 1 composes a message, which is transmitted to the data processor 2 advantageously via interface blocks 9, 7. This message contains information on the command word uttered by the user. The message can be, for example an ASCII character string, such as "BACK", "OPEN", "1", or "4". This message is transmitted in the data processor 2 to the speech recognition application, which reads the command word in the message and defines which function this command word is connected to. After this, the speech recognition application transmits to the browser application information on the function selected by the user. The browser application conducts this function, in other words the speech control corresponds to a conventional pushbutton function, or a function conducted by means of a pointer.

As an external data transmission channel 8, it is possible to use preferably a serial bus (RS-232), a parallel bus (Centronics), an infrared interface (IR), or a low power RF interface (LPRF). The interface blocks 9, 7 comprise means for transmitting and receiving the signals of the channel structure used in the application in question. In addition, the interface blocks 9, 7 comprise means for conducting a parallel to serial conversion and a serial to parallel conversion.

The invention can also be applied in such a way that the command words are arranged in a hierarchy, in other words the selection is made by uttering two or more command words one after the other, for example "1" "4". This is necessary in such a situation where there are more variable functions on the page than there are free auxiliary command words, and the aim is to control all the functions with speech.

A second example that could be mentioned is the use of e-mail for information retrieval. For example, the user receives an e-mail message, which contains one or more search addresses to an information source, such as the home page of the sender of the message in the Internet data network. This search address is, for example, in the form "http://www.firm.nameoftheperson.com", wherein the identification of the type of the information source is the character string "http://". Thus, the e-mail program can produce a command word or words on the display device 16 of the data processor, on the basis of which the user can give a corresponding audio command when s/he wants to move to examine a page or other source of information mentioned in the e-mail message.

A third example that could be mentioned is the use of short messages, such as SMS (Short Message Service), or paging messages for information retrieval. For example, the user receives in his/her mobile station a short message which contains one or more search addresses, for example in the following way: "Hi! I'm on a visit and I don't have my mobile phone with me. If you need to contact me please call tel: +358 9 123456 or send a telefax: +358 9 654321 or send a short message to the number sms: +358 50 987654." Thus, the e-mail program can produce command words on the display device 16 of the data processor, on the basis of which the user can give a corresponding audio command when s/he wants to move to examine a page or other source of information mentioned in the e-mail message. The identifications of the type of the information source can in this case be the words tel, fax and sms. One option can also be that the user gives the sequence number of the desired alterative, for example "the first", when s/he wants to call the number indicated in the short message. Other corresponding examples of search addresses and identifications to be mentioned in this context are an e-mail address mailto:firstname.lastname@firm.com, and an address according to a file transfer protocol ftp://domain.com. For the sake of clarity, the identifications are underlined in the examples above.

In such a situation when it is not possible to display the whole page on the display device 16 at the same time, the user can scroll the information vertically and/or horizontally on the display device 16. The scrolling can be performed with the keyboard 17 advantageously with arrow up/arrow down/arrow left/arrow right keys (not shown), or by uttering certain command words, such as "SCROLL UP", "SCROLL DOWN", "SCROLL LEFT" or "SCROLL RIGHT". The page up/page down keys can also be used for scrolling the whole display area vertically in one go.

Figure 3:
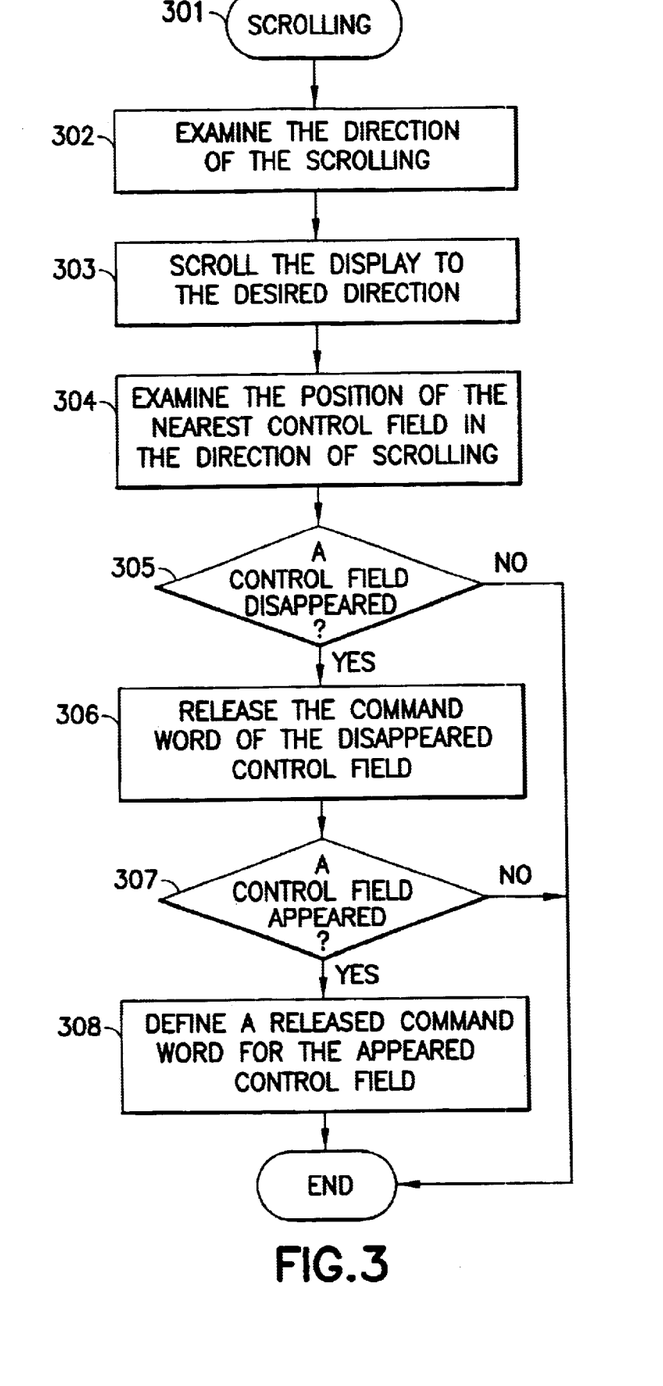
FIG. 3 shows a flow diagram describing an advantageous embodiment of the scrolling method according to the invention.

If there are enough command words to define a separate command word for every control field of the page, the speech recognition application program defines the corresponding command words for the control fields on the page. If, however, there are not enough command words for every control field of the page, the speech recognition application program defines a command word for such control fields that are currently displayed on the display device 16. In a situation in which the user wants to scroll the page on the display device 16, the recognition application program has to redefine some command words. FIG. 3 presents a flow diagram 301 which describes an advantageous embodiment of the scrolling method according to the invention.

In the method, it is first examined, in which direction the user wants to scroll the display (block 302). If the user pressed, for example, an arrow down key, or uttered "SCROLL DOWN" or a similar command, the information displayed on the display device 16 will be moved up, wherein some information from the upper part of the display device 16 disappears (e.g. one line of text) and some information appears into the lower part of the display device 16.

When the page is scrolled on the display device 16 (block 303), it is also examined if there were any such control fields in the disappearing part of the page, for which the program has defined a command word (block 304). This examining can be performed e.g. by first examining the position of the nearest control field on the display device 16 in the direction of movement (block 305), and then examining if that control field will disappear because of scrolling (block 306). If there is such a control field which disappears from the display device 16, the command word defined for that control field can be released (block 307). It is then examined if there are any control fields which appear on the display device 16 because of scrolling (block 308). The released command word can then be defined for such a control field, which appears on the display device during the scrolling (block 309), if any.

It is also possible that more than one control field disappears from the display during one scrolling, wherein several command words are released. Furthermore, more than one control fields can appear onto the display by one scrolling, wherein a command word should be found for each control field. Thus, each released command word can be defined for one control field appearing on the display device 16.

Further, it is possible that when one or more control field disappears from the display during the scrolling, the command word for such control fields which are currently displayed on the display device 16 is redefined. The redefinition can be done e.g. in a way that the command words are defined in particular order for such control fields which are currently displayed on the display device 16, e.g. from left to right and from up to bottom. This embodiment is particularly advantageous when the auxiliary command words are numbers 1, 2, . . . , or letters A, B, . . . For example, the first auxiliary command word "A" or "1" is defined for the upmost control field, the second auxiliary command word "B" or "2" is defined for the control field right from the upmost control field, etc.

In the following, a second advantageous embodiment of the present invention will be described. It is presumed here that speech recognition from text is being used in the speech recognition device 1. In addition to that, the speech recognition device 1 can contain a fixed vocabulary, e.g. numbers and letters. In connection with the loading of the page, the speech recognition application program defines the corresponding auxiliary command words for the variable functions on the page. If the page contains variable functions, for instance links to image files, the speech recognition application program defines the command words for the links preferably in the following way. The application program fetches the target page, or a part of it, from the network, and uses the title of the page (e.g. <title>Jack's Homepage</title>) as a tag. Very often the title is unambiguous as a link name and provides information about the contents of the page.

If, for example, the page contains a link '<a href=iuhr2534.html>ejmg src=iuhr2534.jpg></a>', the first hundred bytes of the iuhr2534.html would be fetched, and the title would be extracted and used as a text tag and/or a voice command word. The voice command word would then be displayed next to the link, and if the terminal cannot display images, the text tag would be used either as a replacement for the image or included with whatever is used to denote an image.

If there is a page with the following links (even though the examples presume usage of http, this invention is not limited to it):

<a href=http://www.nokia.coria/products/><img src=prod.jpg></a>

<a href=http://www.nokia.com/vacancies/><img src=vacjpg></a>

<a href=http://www.redhat.com><img src=rhlogo.jpg></a>

<a href=http://www.netscape.com>Netscape</a> phone list can be found <a href=info1.html>here</a> prices can be found <a href=info2.html>here</a>

<a href=http://home.hiwaay.net:80/doshia><img src=doshia.gif></a>

The application program examines the links to find if there exist similar links. If there are two or more similar links, the application program tries to create a unique text tag and a voice command word for them. In the above example there are two links, which contain the word 'here'. The application program fetches at least part of those pages and examines the content of the fetched part to find the title. The way the title is expressed depends on the format of the page. If it is HTML-format, there is provided a tag <TITLE> in front of actual title text. The title is then extracted and used as a text tag and/or a voice command word. The user is then presented e.g. the following links and voice tags when using the second embodiment of the invention:

Products /Products/

Vacancies /Vacancies/

Redhat /Redhat/

Netscap /Netscape/

Here /Phone list/

Here /Prices/

Doshia's homepage /Doshia's homepage/ or

Doshia's homepage /Doshia's homepage/

If a title cannot be found or the title is found to be too complex a META tag can be used instead. META tag contains information of the page as in the following example:

<META NAME-"description" CONTENT="Jack's homepage is an ultimate collection of links of various topics, such as music, sports, arts etc.">

<META NAME="keywords" CONTENT="Music, Sports, Arts">*

After defining the command words, the user can conduct the function in question by uttering the corresponding command word, which the speech recognition device 1 tries to recognize. SRFT would be applied on the recognition of the command words as in a prior art solution.

If the title of the target page is too complex or too long, the first advantageous embodiment of the invention can be used instead. In this situation the application program defines one predefined command word for such a link as was described above in the description.

This second embodiment of the invention will add greatly the user friendliness of the tagging system, and it provides a way to generate meaningful replacement link names for browsers which cannot display images (e.g. in WAP) and/or which use voice input.

The present invention is not restricted solely to the embodiments presented above, but it can be modified within the scope of the appended claims.

What is claimed is:

1. A method for controlling a data processor with a group of audio commands, the method comprising:
   presenting information on a display device of the data processor;
   forming at least one control field to which a predetermined function is assigned on the display device;
   assigning one audio command from said group of audio commands to said control field; and
   presenting the audio command assigned to said control field on the display device, wherein when a user utters the audio command assigned to the control field, the audio command is recognized and the function corresponding to the audio command is conducted.

2. The method according to claim 1, wherein said group of audio commands is a predetermined group of audio commands.

3. The method according to claim 2, further comprising:
   forming at least a first and a second control field on the display device;
   assigning a predetermined first function and one audio command from said group of audio commands to said first control field; and
   assigning a predetermined second function and one audio command unassigned to any control field from said group of audio commands to said second control field.

4. The method according to claim 2, wherein at least one of the control fields has a substantially standard content irrespective of the information presented at a time, and at least one of the control fields varies according to the information to be presented at a time.

5. The method according to claim 1, further comprising retrieving the information to be presented to the data processor from at least a data network, the Internet data network, an e-mail data network or a telecommunication data network.

6. The method according to claim 5, further comprising assigning address data to at least one control field, for retrieving information from said data network.

7. The method according to claim 1, further comprising using a WWW browser application program to present information.

8. The method according to claim 1, further comprising:
   scrolling the information presented on the display device;
   examining if any control field, which is assigned an audio command, disappeared from the display device, or if any control field appeared on the display device in connection with the scrolling; and
   redefining an audio command for control fields which are currently displayed on the display device.

9. The method according to claim 1, further comprising:
   scrolling the information presented on the display device;
   examining if any control field, which is assigned an audio command, disappeared from the display device in connection with the scrolling, wherein said audio command is released; and
   examining if any control field appeared on the display device in connection with the scrolling, wherein said released audio command is defined for said appearing control field.

10. The method according to claim 1, wherein at least one control field comprises a link to an information source, the method further comprising:
    forming at least one audio command of said group of audio commands based on the information included in said information source; and
    assigning said audio command to said control field.

11. The method according to claim 10, wherein at least one information source includes an identifier, the method further comprising forming at least one audio command based on said identifier.

12. The method according to claim 10, wherein said identifier is a title.

13. The method according to claim 10, wherein said identifier is a META tag.

14. A device controlled with audio commands, comprising:
    an audio recognition device;
    a data processor;
    a display device for presenting information;
    means for forming at least one control field on the display device;
    means for assigning a predetermined function to said control field;
    means for assigning an audio command to said control field;
    means for presenting the audio command assigned to the control field on the display device;
    means for recognizing the audio command; and
    means for conducting the function corresponding to the recognized audio command.

15. The device according to claim 14, further comprising:
    means for forming at least a first and a second control field on the display device;
    means for assigning the predetermined first function to said first control field;
    means for assigning the predetermined first function and one audio command from said group of audio commands to said first control field;
    means for assigning the predetermined second function to said second control field; and
    means for assigning the predetermined second function and one audio command unassigned to any control field from said group of audio commands to said second control field.

16. The device according to claim 14, wherein at least one of the control fields are arranged to have a substantially standard content, irrespective of the information presented at a time, and at least one of the control fields are arranged to be variable according to the information presented at a time.

17. The device according to claim 14, further comprising means for retrieving information to be presented from at least a data network, the Internet data network, an e-mail data network or a telecommunication data network.

18. The device according to claim 17, further comprising means for assigning address information to at least one control field, in order to retrieve information from said data network.

19. The device according to claim 14, wherein the audio recognition device is a fixed vocabulary speech recognition device.

20. The device according to claim 14, further comprising:
    means for scrolling the information presented on the display device;
    means for examining, if any control field, which is assigned an audio command, disappeared from the display device in connection with the scrolling;
    means for examining, if any control field appeared on the display device in connection with the scrolling; and
    means for redefining an audio command for control fields which are displayed on the display device after the scrolling.

21. The device according to claim 14, further comprising:

means for scrolling the information presented on the display device;

means for examining, if any control field, which is assigned an audio command, disappeared from the display device in connection with the scrolling;

means for releasing said audio command, which is assigned to said disappearing control field;

means for examining, it any control field appeared on the display device in connection with the scrolling; and means for defining said released audio command for said appearing control field.

22. The device according to claim 14, wherein at least one control field includes a link to an information source, the device further comprising:

means for forming at least one audio command based on the information included in said information source; and means for assigning said audio command to said control field.

23. The device according to claim 22, wherein said identifier is a title.

24. The device according to claim 22, wherein said identifier is a META tag.

25. The device according to claim 22, wherein at least one information source comprises an identifier, and at least one audio command is formed based on said identifier.

* * * * *